US012761192B2

(12) United States Patent
Preston et al.

(10) Patent No.: US 12,761,192 B2
(45) Date of Patent: Oct. 13, 2026

(54) METHODS, MEDIUMS, AND SYSTEMS FOR TARGETED ISOTOPE CLUSTERING

(71) Applicant: Waters Technologies Ireland Limited, Dublin (IE)

(72) Inventors: Chris Preston, Bedlington (GB); Christopher Knowles, Eighton Banks (GB); Ian Morns, Hexham (GB); Ian Reah, Cramlington (GB)

(73) Assignee: Waters Technologies Ireland Limited, Dublin (IE)

( * ) Notice: Subject to any disclaimer, the term of this patent is extended or adjusted under 35 U.S.C. 154(b) by 541 days.

(21) Appl. No.: 18/326,263

(22) Filed: May 31, 2023

(65) Prior Publication Data

US 2023/0384274 A1 Nov. 30, 2023

Related U.S. Application Data

(60) Provisional application No. 63/347,208, filed on May 31, 2022.

(51) Int. Cl.
*G01N 30/86* (2006.01)
*G01N 30/72* (2006.01)

(52) U.S. Cl.
CPC ..... *G01N 30/8679* (2013.01); *G01N 30/7233* (2013.01); *G01N 30/8631* (2013.01)

(58) Field of Classification Search
CPC ........... G01N 30/8679; G01N 30/8631; G01N 30/7233; H01J 49/0036
See application file for complete search history.

(56) References Cited

U.S. PATENT DOCUMENTS 11,450,518 B2 * 9/2022 Yasuda .................. G01N 30/86
11,784,034 B2 * 10/2023 Philipp ............. G01N 23/2258
250/282

(Continued)

FOREIGN PATENT DOCUMENTS

WO 2016196432 A1 12/2016

OTHER PUBLICATIONS

International Search Report and Written Opinion for International Patent Application No. PCT/IB2023/055589, mailed Sep. 28, 2023.

(Continued)

*Primary Examiner* — An H Do
(74) *Attorney, Agent, or Firm* — Goodwin Procter LLP

(57) ABSTRACT

Exemplary embodiments provide computer-implemented methods, mediums, and apparatuses configured to perform targeted isotope clustering. A mass spectrum for a sample may be obtained from an analytical laboratory instrument, and a set of peaks within the mass spectrum may be identified. A list of fragments expected to be potentially present in the sample may be obtained, and a set of predicted peaks may be generated from the list. The spectrum may be searched for the predicted peaks to determine if any combination of the peaks present in the spectrum match the expected fragment patterns. Accordingly, isotope (charge) clusters may be built in a targeted way using a priori knowledge to target the matches. As a result, spectrum analysis can be done more quickly and efficiently than in conventional systems that use neutral or untargeted matching, and the matches can be made more accurately.

22 Claims, 11 Drawing Sheets

(56) References Cited

U.S. PATENT DOCUMENTS

| | | | | |
|---|---|---|---|---|
| 12,181,455 | B2 * | 12/2024 | Nedwed | H01J 49/0036 |
| 2007/0158542 | A1 | 7/2007 | Bauer et al. | |
| 2009/0278037 | A1 | 11/2009 | Grothe | |
| 2020/0355654 | A1 * | 11/2020 | Hobby | G01N 30/72 |

OTHER PUBLICATIONS

International Preliminary Report on Patentability for International Patent Application No. PCT/IB2023/055589, mailed Dec. 12, 2024.

* cited by examiner

METHODS, MEDIUMS, AND SYSTEMS FOR TARGETED ISOTOPE CLUSTERING

CROSS-REFERENCE TO RELATED APPLICATIONS

This application claims the benefit of and priority to U.S. Provisional Patent Application No. 63/347,208, filed May 31, 2022. The entire disclosure of which is hereby incorporated by reference.

BACKGROUND

Laboratory analytical instruments are devices for qualitatively and/or quantitatively analyzing samples. They are often used in a laboratory setting for scientific research or testing. Such devices may measure the chemical makeup of a sample, the quantity of components in a sample, and perform similar analyses. Examples include mass spectrometers, chromatographs, titrators, spectrometers, elemental analyzers, particle size analyzers, rheometers, thermal analyzers, etc.

Laboratory analytical instruments may produce raw data readings that are combined into a spectrum representing measured values for the sample. For instance, a mass spectrometer may decompose a subset of precursor ions into a set of product ions, and then accelerate the product ions and remaining precursor ions through a magnetic field. Due to the action of the magnetic field, the ions will impact at different locations on a detector. Because ions having the same mass-to-charge ratio (m/z) will be deflected by the magnetic field by approximately the same amount, the detector can measure the number of ions that impact in various locations, mapping each location to a corresponding mass-to-charge ratio. When plotted (as m/z versus intensity), these results represent a mass spectrum.

An ion may be constituted in different ways due to the presence of different isotopes in the ion. For instance, the methyl cation $CH_3^+$ can have a mass ranging from 15 (when carbon-12 bonds with a protium isotope as $^{12}C^1H_3^+$) to 19 (when carbon-13 bonds with a deuterium isotope as $^{13}C^2H_3^+$) Similarly, because different ions can have different charge states (representing the net charge on the ion), the charge value of a given ion can vary. Accurately identifying the isotopes present in a sample and the charge states of the sample's precursor and product ions is an important part of accurately measuring the chemical composition of the sample.

BRIEF SUMMARY

Exemplary embodiments relate to improved techniques for identifying isotopes in analytical chemistry data. Exemplary embodiments may include computer-implemented methods, as well as non-transitory computer-readable mediums storing instructions for performing the methods, apparatuses configured to perform the methods, etc.

According to a first embodiment, a computer-implemented method includes receiving, at an analysis device, a spectrum generated by analysis of a sample with a laboratory analytical instrument, the spectrum comprising a plurality of detected peaks. The spectrum may be a mass spectrum that maps a detected mass-to-charge ratio (m/z) of precursor and product ions to an intensity that represents a frequency or amount of times that an ion of the detected m/z ratio registered on a detector of the laboratory analytical instrument. The detected peaks may be detected by a peak detection algorithm operative on a server or cloud computing device and stored in a peak list that contains at least an m/z value for a detected peak and an intensity of the detected peak.

A list of predicted fragments that are potentially present in the sample may be received at the analysis device. The list of predicted fragments may be retrieved by searching the ion library for a user-selected set of molecules expected to be present in the sample.

The list of predicted fragments may be retrieved from an ion library hosted at a server, cloud computing service, or other location that includes the known fragmentation patterns of molecules. The fragmentation patterns may include a list of ions, which may include precursor ions, that are known or predicted to result when the molecules are subjected to ionization. The fragmentation patterns may be developed through experimentation, modeling, based on expert analysis, etc. In some embodiments, the known chemical composition of a precursor or analyte of interest may be selected, and this chemical composition may be processed in order to identify the chemical composition of fragments that are likely to result from ionization of the precursor/analyte. Because the prevalence of certain isotopes may be known, the expected isotope patterns for each fragment may be worked out based on its chemical composition. This yields a predicted pattern of neutral masses that can be further processed in order to convert the masses into predicted m/z values for each possible charge state.

Thus, each predicted fragment may be associated with one or more isotopes that make up the predicted fragment, potential charge states for the fragment, and an associated mass value based on the isotopic composition and/or a predicted m/z value.

The plurality of detected peaks may be matched against the list of predicted fragments based on a mass tolerance to generate a list of potential matches at the analysis device. The mass tolerance may define an acceptable range of values (e.g., in parts-per-million or "ppm") within which a detected peak will be considered a match to a predicted peak from a predicted fragment. The mass tolerance may be user-specified, and/or may be a default value.

At this stage, a minimum threshold intensity may be established, below which a detected peak will not be considered for matching. Peaks below the minimum threshold intensity may be ignored on the assumption that they result merely from noise in the analysis.

To check the detected peaks against the mass tolerance, each detected peak above the minimum intensity threshold may be considered in turn by the analysis device. For each isotope of each fragment at each charge state (optionally up to a specified maximum charge state; see the seventh embodiment), the observed m/z of the peak may be compared to the expected m/z of the predicted isotope. If the observed m/z is within the mass tolerance of the expected m/z, the predicted isotope may be recorded as a possible match in the list of potential matches.

This process by which detected peaks are matched to potential isotopes by mass is referred to herein as a first stage of processing. At the end of this stage, a complete list of every possible match between observed peaks and predicted isotopes that would pass the mass error criteria has been established.

As a second stage of processing at the analysis device, one or more charge clusters may be built from the list of potential matches based on how well an intensity of each potential match in the list corresponds to an expected intensity of the corresponding predicted fragment. The goal at this stage is to develop charge clusters from the observed spectrum whose isotope profile is a good fit for the predicted isotope profile.

Building the charge clusters may involve consideration of each detected peak in the observed spectrum. The peaks may be considered in intensity order (i.e., from most-intense to least-intense), because prioritizing intensity tends, in general, to produce the most confident matches. Nonetheless, each peak will eventually be considered. If a selected peak has more than one predicted isotope that was close enough to pass the mass filter in the previous stage, each will be considered in turn, optionally in an order based on how closely the predicted isotope matched to the selected peak in terms of mass.

One of the parameters considered by the logic may be the maximum possible charge state, which may be set to a default value (e.g., 10) and/or specified by a user (see the seventh embodiment below). Each possible charge state up to the maximum may be considered in turn. For each charge state, the logic may determine which isotope is expected to be the most intense. The list of peaks that were matched to that isotope during the first stage of processing may be retrieved and considered in intensity order.

In some embodiments, instead of a maximum possible charge state, the system may present a list of possible charge states that could be observed with in the given input m/z range for a particular sample. The possible charge states may optionally be limited by a user specified maximum. A user may select charge states from the list (or may allow all the possible charge states to be searched).

By the choice of a predicted fragment isotope and a matched experimental peak, an intensity expectation is established against which other neighboring peaks can be evaluated. In particular, the predicted fragment pattern describes the relative prevalence of different isotopes in the fragment. The most prevalent isotope (and therefore the isotope with the greatest expected intensity) may be considered a reference value (e.g., 100%). The remaining isotopes in the pattern may be measured against this reference value (e.g., an isotope expected to be half as prevalent as the most prevalent isotope could be considered to have a value of 50%). The intensity of the experimental peak that is matched to the predicted fragment isotope (having the greatest expected intensity) can be used as a reference (e.g., if the intensity of the experimental peak is 300, then the most prevalent isotope would be expected to have an intensity of 300 and the isotope that is half as prevalent would be expected to have an intensity of 150).

Intensity expectations may accordingly be established for each isotope in the predicted fragment, and compared to corresponding peaks in the observed spectrum. If a particular peak matches an expected intensity above a threshold value (e.g., a threshold value in the range of 60%-85% of expected intensity, preferably 60%-80%, more preferably 65%-75%, and most preferably about 70%), then the peak is accepted. If not, the peak is rejected.

By performing this comparison peak-by-peak for the entire cluster, an isotope profile is built. The isotope profile may include the peaks that were accepted. Some peaks that were predicted might not have been observed within the threshold limit and may therefore be absent from the isotope profile—i.e., the profile may include gaps where individual peaks were rejected.

An isotope profile fit calculation may then be performed for the entire cluster. For example, the logic may compare the total expected intensity for all the isotopes in the cluster (scaled based on the intensity expectation discussed above) against the total intensity of the corresponding matched peak locations in the observed spectrum. The totals may be compared to a threshold value (which may be the same as the intensity threshold by which each individual peak was compared, as discussed above, or which may be different). If the entire cluster meets the intensity threshold, then it may be accepted as a finalized match. If not, the entire cluster may be rejected and not further considered.

Accordingly, the logic develops a list of candidate charge clusters that can be built from the observed spectrum according to the predictions. In practice, there is usually (though not necessarily always) a single set of charge clusters that meet the above-described threshold criteria. If there is more than one set of charge clusters, the sets may be stored in a database. The candidate set or sets may be presented on a display of the analysis device so that a user can select a particular set; alternatively, the logic may select a set that best matches the observed spectrum (see the third embodiment below).

According to a second embodiment suitable for use with the first embodiment, an ambiguous set of detected peaks capable of being matched to two or more predicted fragments may be identified.

Multiple isotope profiles that match the same raw data points may have no isotopes that are unique to one of the isotope clusters. In these cases, there may be no way to distinguish between. In cases where there are unique isotopes to one of the isotope clusters, the logic may distinguish between the contested isotope profiles causing the ambiguous matching, and flag those to the user as partially ambiguous. In this way, conflicting isotope profiles on the same raw data area can be detected and flagged to a user.

Peaks may be ambiguous for a number of reasons. For instance, two or more fragments that could match to the peaks may have very similar neutral masses and similar enough compositions that it is not possible to tell them apart by mass or isotope profile—they will appear the same in the observed spectrum. For instance, some molecules are palindromic or symmetrical (at least at the ends, possibly with very few unique monomers), which may be by design. This is referred to as a complete ambiguity because the ambiguity may not be resolvable.

In another example, peaks/fragments may have ambiguous harmonics. That is, two or more ions may have charge states that coincide in such a way that one of them could match every $n^{th}$ isotope of the other in at least one charge state. Such ions may be partially ambiguous because the ambiguity may be resolvable.

In still another example, peaks/fragments may represent overlapping neighbors. In this case, the ions are not close enough in m/z to completely overlap or form harmonics, but do have some overlap between the lightest isotope of one ion and the heaviest isotope of another. Depending on the circumstances, it is possible that an ambiguity of this type may be resolved by mass or isotope fit, since the two ions may not occupy the same space overall on the m/z axis. Thus, these ambiguities may also be partial.

The ambiguous set of detected peaks may be flagged with an indication of the two or more predicted fragments. In some embodiments, the ambiguous set of detected peaks may be displayed on a display of the analysis device along with an explanation of why the peaks are ambiguous (e.g., which of the above-described categories of ambiguity is applicable to the peaks).

According to a third embodiment suitable for use with the first or second embodiments, a best fit may be selected from the finalized match set based on which charge cluster accounts for the most total intensity of the corresponding detected peak. As noted above, isotope profiles may be added to the finalized match set based on the isotope profile accounting for at least a predetermined minimum threshold amount of the intensity observed in the spectrum. In the third embodiment, whichever of these isotope profiles accounts for the most intensity may be selected as the best fit.

According to a fourth embodiment suitable for use with any of the first through third embodiments, a quality metric may be calculated for at least one of the charge clusters stored in the finalized match set. The quality metric may represent one or a combination of an isotope spacing mean, an isotope spacing median, an isotope spacing deviation, a mass error mean, a mass error median, or a mass error deviation. The calculated quality metric may be displayed on a display. In general, the more evenly spaced the matches of the charge cluster are, the more likely it is that the match is the correct one (i.e., a confidence score may be assigned to the matches, and the more evenly-spaced matches may be associated with a higher confidence score).

According to a fifth embodiment suitable for use with any of the first through fourth embodiments, the expected intensity may be associated with a threshold value in the range of 60%-85%, preferably 60%-80%, more preferably 65%-75%, and most preferably about 70%. A 70% threshold tends to capture the best match. A lower threshold may capture more possible matches, but also captures false positives. Below about 60%, the false positive rate becomes quite high. As the threshold is raised, the logic becomes more stringent in its matches and filters out more possible isotope profile matches. Above about 80%, almost all matches are filtered out because real-world data is probably not sufficiently clean to match predictions this closely (i.e., an 80% threshold assumes a level of data integrity that is unlikely). Nonetheless it has been found that, for certain applications, the threshold can be raised to as high as 85% to get the best quality of matching with the understanding that some data will be lost.

According to a sixth embodiment suitable for use with any of the first through fifth embodiments, a first charge cluster and a second charge cluster may be matched to a same detected peak. After the first charge cluster is matched to the detected peak, an intensity of the detected peak may be discounted when matching the second charge cluster. This allows the logic to match an isotope to two different peaks, meaning that errors early in the process are less likely to compound (as discussed in more detail below with respect to traditional techniques).

According to a seventh embodiment suitable for use with any of the first through sixth embodiments, a maximum charge for a precursor ion in the analysis may be defined. The list of predicted fragments may be limited based on the maximum charge for the precursor ion. This allows the possible search space for isotope profile matches to be limited to a reasonable number, further improving processing speed and reducing resource requirements.

Traditional algorithms process raw spectrum data in an untargeted way and therefore lose some information on conflicts between isotope clusters in a raw data area. In contrast, exemplary embodiments match predicted isotope clusters to the raw data. This makes it possible to match two predicted isotope clusters to the same raw data area. In traditional methods this information is lost, as the processed raw data point is a single entity that is removed from consideration after a first match has been made. In the approach described herein, more than one isotope cluster capable of forming that entity can be identified, and therefore all of the isotope clusters that contest the same raw data points can be matched. The different possible combinations can be flagged to a user along with a recommendation for how to consume that information (e.g., describing a type of ambiguity present in the data, or a reason why the data could not be matched to a single definitive isotope profile).

Other technical features may be readily apparent to one skilled in the art from the following figures, descriptions, and claims.

Unless otherwise noted, it is contemplated that each embodiment may be used separately to achieve the advantages specifically identified above. It is also contemplated that the embodiments described above (and elsewhere herein) may be used in any combination to achieve further synergistic effects. Other technical features will be readily apparent to one skilled in the art from the following figures, descriptions, and claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
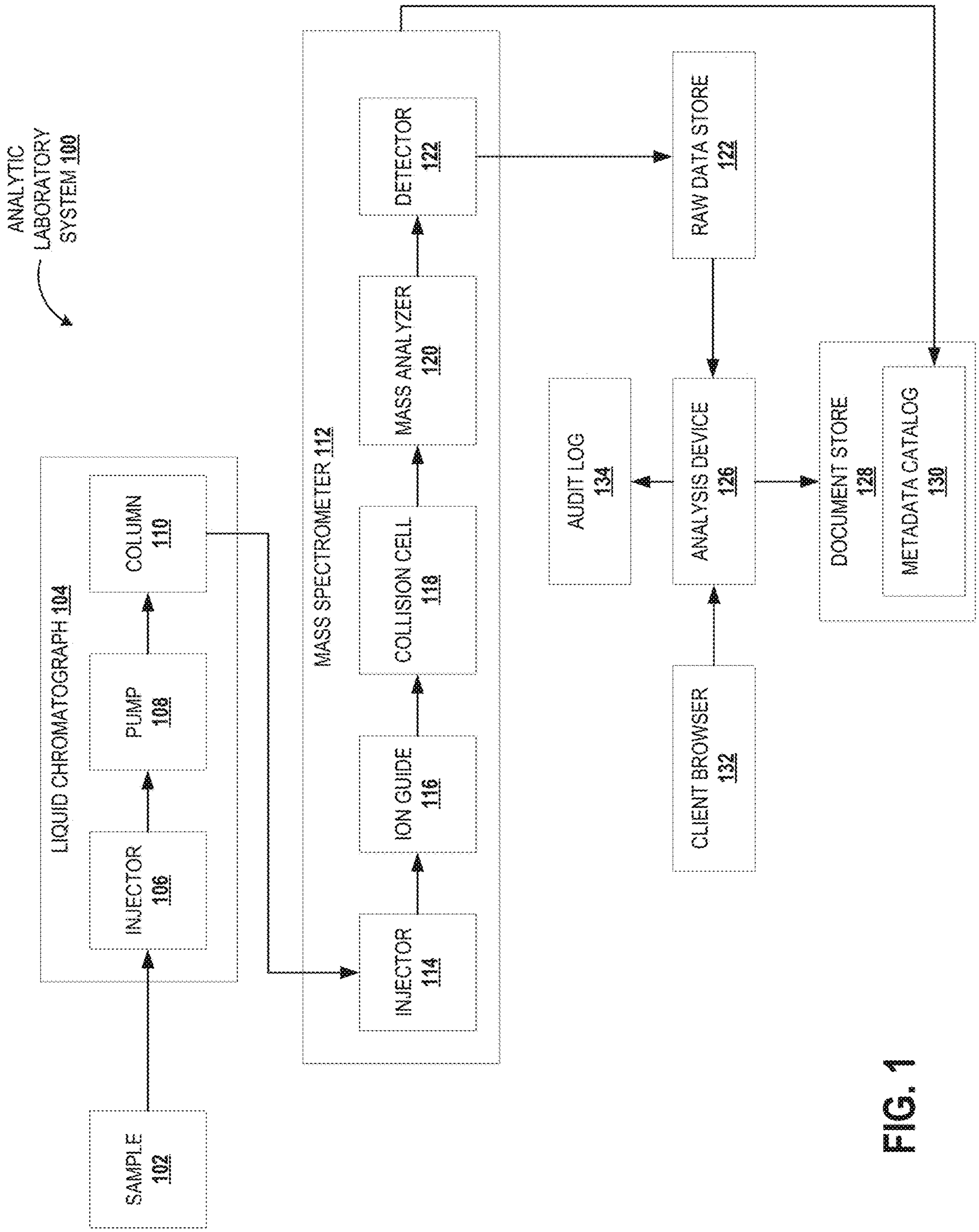
FIG. 1 illustrates an analytic laboratory system 100 suitable for use with exemplary embodiments.

One step in a laboratory analysis may be to identify the isotopes present in a sample. Conventionally, this is done by acquiring a spectrum as described above and identifying peaks in the spectrum (i.e., m/z values in the spectrum having relatively high levels of intensity, indicating the likely presence of an ion having the corresponding m/z value among the precursor or product ions). Those peaks form a kind of signature that can be matched against a database of ions with known characteristics.

There are several problems with conventional isotope matching techniques. First, these techniques generally require a great deal of time and computational resources. Any given mass spectrum may include ions formed from different possible combinations of isotopes (resulting in ions of different mass). As each precursor ion is fragmented, the resulting product ions may acquire different levels of charge. These combinations of masses and charges result in m/z patterns that must be matched in combination with each other against all the possible ions found in the database. For example, a sample may include multiple precursor ions, each of which fragments into a different (possibly overlapping) set of product ions having different masses and charges, in addition to impurities which could introduce additional precursor and product ions. The system needs to combinatorially match the precursor ions and their corresponding product ions against all the possibilities present in the database.

Consequently, a computing system must consider an inordinate amount of data when performing the matching. This consumes memory, processing power, energy, and time. If results are needed on a relatively short deadline, it may not be possible to match the ions unless an extraordinary amount of computing resources are thrown at the problem.

Second, conventional techniques can compound errors encountered early in the matching process. In a typical isotope matching process, a system attempts to identify, as a first match, a combination of peaks that the system is most confident about (e.g., "this particular set of peaks in the data matches to the fragmentation pattern of ion X having charge state Y in the database with 93% accuracy"). The system then removes the matched peaks from consideration and repeats the process with any remaining peaks.

However, some mistakes will almost certainly be made when performing these matches due to the presence of noise, imperfect decomposition of the precursor ions, impurities, an imperfect configuration of the laboratory analytical instrument, etc. If a set of peaks in the data are matched to the ions in the database erroneously, those peaks are removed from consideration and not subsequently considered for matching to the next round of candidate ions. Accordingly, some peaks that represent actual precursor or product ions may be left out of the analysis, which can cause further erroneous matches. This results in lower accuracy as problems early in the analysis corrupt later results and the errors continue to cascade.

Exemplary embodiments address these problems by targeting the isotope matching process with a priori expectations. Most laboratory tests are not performed in the absence of any prior knowledge about the sample. For instance, it may be known that a sample contains a certain molecule or combination of molecules, but not which isotopes the molecules are made up of. Alternatively, a lab test may be attempting to determine whether Compound X is present in Sample Y; the identity of the target (Compound X) is already known. Still further, a laboratory test may attempt to determine the purity of a sample, i.e. the quantity of a predetermined compound as compared to other compounds in the sample. Thus, it is often the case that at least some of the expected precursor ions present in a sample are known before sample analysis is carried out.

Whereas conventional techniques use the mass spectrum obtained from sample analysis as the starting point (attempting to match peaks in the spectrum to a database of known ions), exemplary embodiments start by identifying patterns expected to be seen in the data based on prior knowledge about the sample. Those known patterns may then be matched, if possible, to what was observed in the spectrum. This greatly reduces the time and resources required to make a match, while also allowing for greater accuracy and the possibility to account for ambiguous fragments—i.e., fragments that could match to two or more possible ions, but which conventional techniques typically definitively match to one or the other.

As an aid to understanding, a series of examples will first be presented before detailed descriptions of the underlying implementations are described. It is noted that these examples are intended to be illustrative only and that the present invention is not limited to the embodiments shown.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through **122-*a* may include components 122-1, 122-2, 122-3, 122-4, and 122-5**. The embodiments are not limited in this context.

These and other features will be described in more detail below with reference to the accompanying figures.

For purposes of illustration, FIG. 1 is a schematic diagram of an analytic laboratory system that may be used in connection with techniques herein. Although FIG. 1 depicts particular types of laboratory analytical instruments in a specific liquid chromatography/mass spectrometry (LCMS) configuration, one of ordinary skill in the art will understand that different types of chromatographic devices (e.g., MS, tandem MS, etc.) may also be used in connection with the present disclosure.

A sample 102 is injected into a liquid chromatograph 104 through an injector 106. A pump 108 pumps the sample through a column 110 to separate the mixture into component parts according to retention time through the column.

The output from the column is input to a mass spectrometer 112 for analysis. Initially, the sample is desolved and ionized by a desolvation/ionization device 114. Desolvation can be any technique for desolvation, including, for example, a heater, a gas, a heater in combination with a gas or other desolvation technique. Ionization can be by any ionization techniques, including for example, electrospray ionization (ESI), atmospheric pressure chemical ionization (APCI), matrix assisted laser desorption (MALDI) or other ionization technique. Ions resulting from the ionization are fed to a collision cell 118 by a voltage gradient being applied to an ion guide 116. Collision cell 118 can be used to pass the ions (low-energy) or to fragment the ions (high-energy).

Different techniques may be used in which an alternating voltage can be applied across the collision cell 118 to cause fragmentation. Spectra are collected for the precursors at low-energy (no collisions) and fragments at high-energy (results of collisions).

The output of collision cell 118 is input to a mass analyzer 120. Mass analyzer 120 can be any mass analyzer, including quadrupole, time-of-flight (TOF), ion trap, magnetic sector mass analyzers as well as combinations thereof. A detector 122 detects ions emanating from mass analyzer 122. Detector 122 can be integral with mass analyzer 120. For example, in the case of a TOF mass analyzer, detector 122 can be a microchannel plate detector that counts intensity of ions, i.e., counts numbers of ions impinging it.

A raw data store 124 may provide permanent storage for storing the ion counts for analysis. For example, raw data store 124 can be an internal or external computer data storage device such as a disk, flash-based storage, and the like. An analysis device 126 analyzes the stored data. Data can also be analyzed in real time without requiring storage in a storage medium 124. In real time analysis, detector 122 passes data to be analyzed directly to analysis device 126 without first storing it to permanent storage.

Collision cell 118 performs fragmentation of the precursor ions. Fragmentation can be used to determine the primary sequence of a peptide and subsequently lead to the identity of the originating protein. Collision cell 118 includes a gas such as helium, argon, nitrogen, air, or methane. When a charged precursor interacts with gas atoms, the resulting collisions can fragment the precursor by breaking it up into resulting fragment ions. Such fragmentation can be accomplished by switching the voltage in a collision cell between a low voltage state (e.g., low energy, <5 V) and a high voltage state (e.g., high or elevated energy, >15V). High and low voltage may be referred to as high and low energy, since a high or low voltage respectively is used to impart kinetic energy to an ion.

Various protocols can be used to determine when and how to switch the voltage for such an MS/MS acquisition. After data acquisition, the resulting spectra can be extracted from the raw data store 124 and displayed and processed by post-acquisition algorithms in the analysis device 126.

Metadata describing various parameters related to data acquisition may be generated alongside the raw data. This information may include a configuration of the liquid chromatograph 104 or mass spectrometer 112 (or other chromatography apparatus that acquires the data), which may define a data type. An identifier (e.g., a key) for a codec that is configured to decode the data may also be stored as part of the metadata and/or with the raw data. The metadata may be stored in a metadata catalog 130 in a document store 128.

The analysis device 126 may operate according to a workflow, providing visualizations of data to an analyst at each of the workflow steps and allowing the analyst to generate output data by performing processing specific to the workflow step. The workflow may be generated and retrieved via a client browser 132. As the analysis device 126 performs the steps of the workflow, it may read read raw data from a stream of data located in the raw data store 124. As the analysis device 126 performs the steps of the workflow, it may generate processed data that is stored in a metadata catalog 130 in a document store 128; alternatively or in addition, the processed data may be stored in a different location specified by a user of the analysis device 126. It may also generate audit records that may be stored in an audit log 134.

Figure 8:
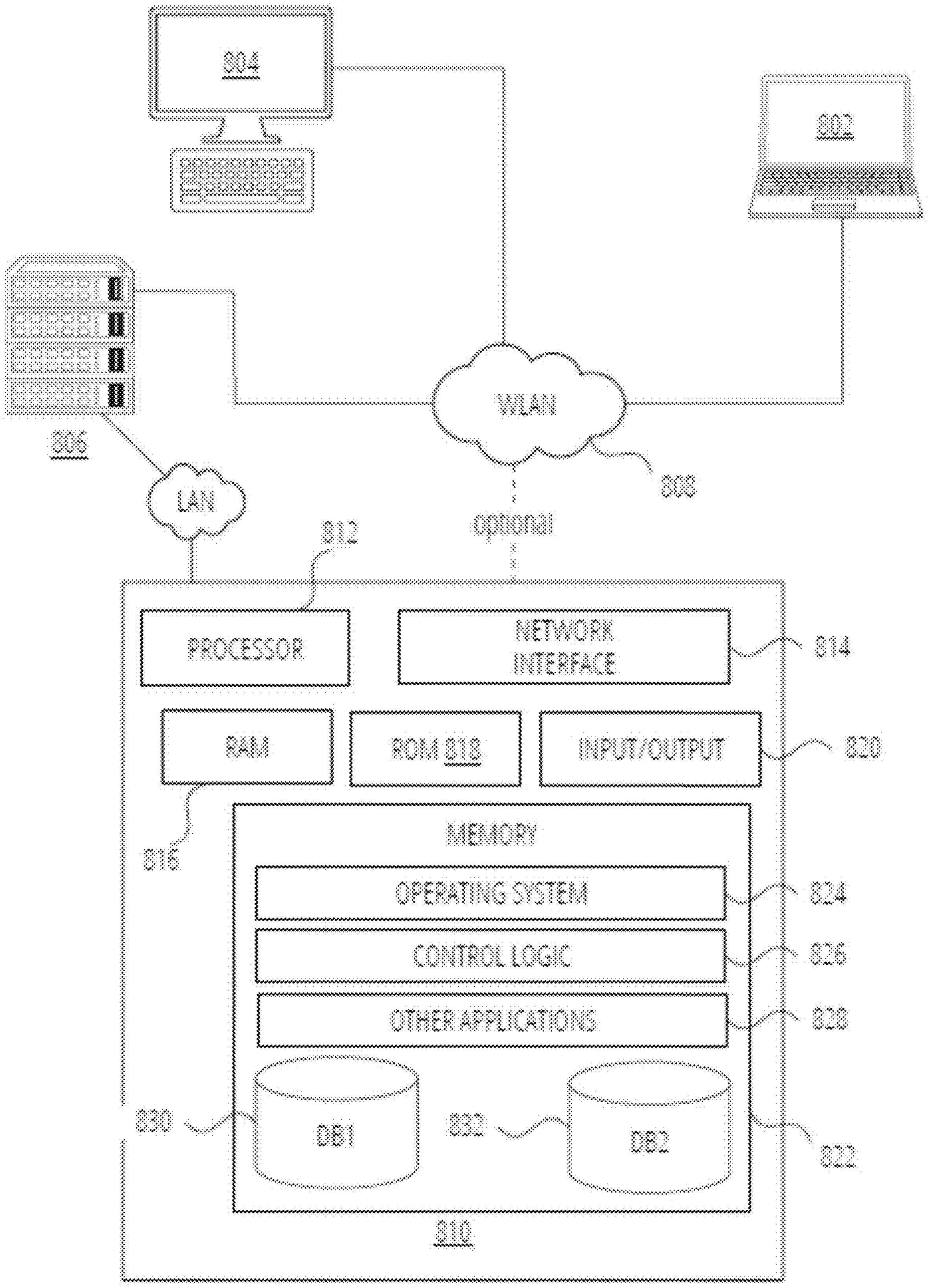
FIG. 8 depicts an illustrative computer system architecture that may be used to practice exemplary embodiments described herein.

The exemplary embodiments described herein may be incorporated into the analysis device 126 (potentially in conjunction with a cloud computing device, as described in more detail below). They may also or alternatively be performed at the client browser 132, among other locations. An example of a device suitable for use as an analysis device 126, and/or a client browser 132, as well as various data storage devices, is depicted in FIG. 8.

Figure 2A:
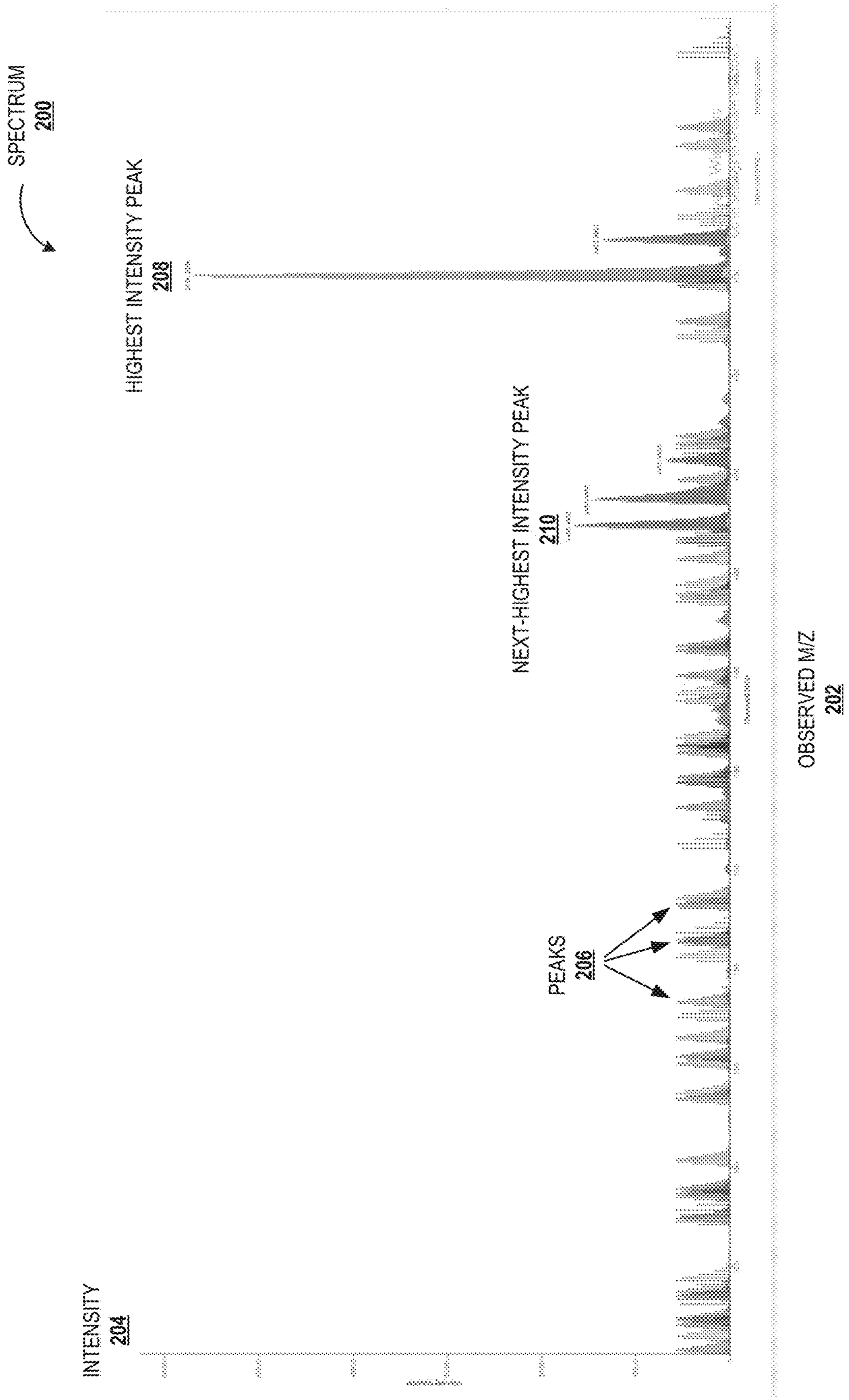
FIG. 2A depicts an example of a mass spectrum 200.

FIG. 2A depicts an example of a mass spectrum 200. The spectrum 200 represents measurements of a number of ions detected at various locations on the detector 122; different locations correspond to different m/z values 202. The number of detections that occur at each location represents an intensity value 204. The presence of ions in the sample are generally marked by the presence of intensity peaks 206 at m/z values in the spectrum 200 corresponding to the ion's m/z ratio.

The higher the intensity peak 206, the more ions that were registered by the detector. Although some peaks 206 may result from noise or impurities, relatively high peaks are most likely due to the presence of a measurable number of ion fragments in the sample. For example, the depicted spectrum includes a highest intensity peak 208 having an intensity value 204 greater than that of any other peak 206. A next-highest peak 210 has the second greatest intensity value 204; the remaining peaks could also be ranked in intensity order.

Generally, the raw spectrum 200 is processed to produce a peak list. The peak list may take the form of a table or list of key, value pairs. The peak list generally maps a particular m/z value to an intensity corresponding to the intensity value 204 of the peak detected at that m/z value. Because of the way that the sample is measured, peaks are rarely represented by a single discrete quantity; instead, they usually have a shape with tapering tails on either side of an m/z value having the greatest intensity. The peak list may include this greatest intensity and the corresponding m/z value. In some cases, the peak list may include metrics describing the shape of the peak, such as its width, the configuration of the peak's tails, etc. The peak list is generally established by a peak-picking algorithm that examines the spectrum 200 in order to isolate peaks 206 based on their intensities and shapes.

Figure 2B:
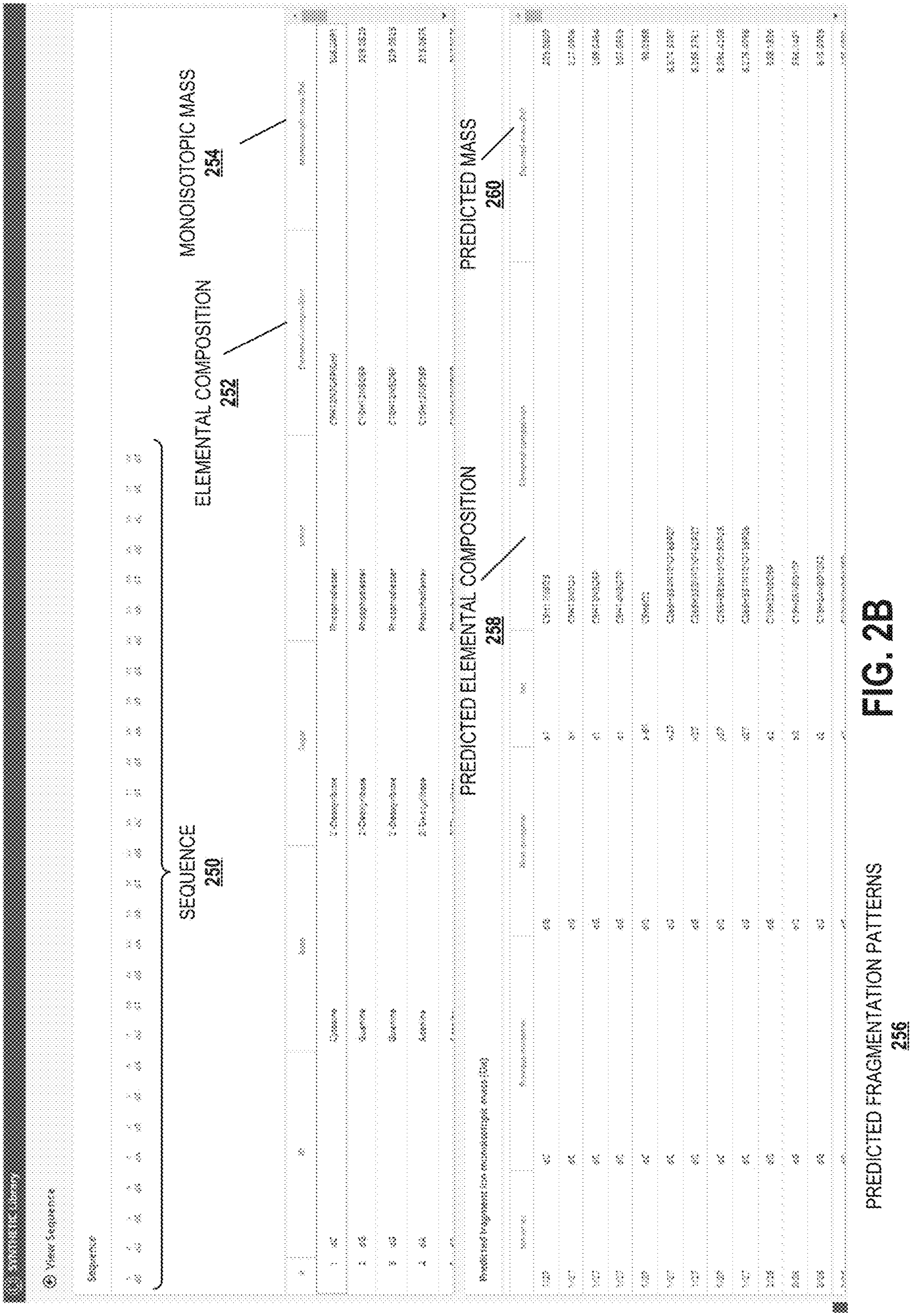
FIG. 2B depicts an example of predicted fragment ions resulting from fragmentation of a known oligonucleotide sequence, according to an exemplary embodiment.

The spectrum 200 and/or peak list can be matched against prediction from an ion database. FIG. 2B depicts an example of predicted fragment ions resulting from fragmentation of a known oligonucleotide ("oligo") sequence 250, according to an exemplary embodiment.

In this example, the oligo sequence 250 is defined by a series of structures include a base, sugar, and linker. Each such structure is defined by an elemental composition 252 from which the structure's monoisotopic mass 254 can be determined.

Given a particular sequence 250 having a specified elemental composition 252, it is possible to determine the fragments 256 that are expected to result from ionization of the sequence 250. These fragments 256 may be established theoretically (e.g., through modeling, simulation, or deduction based on chemistry principles) and/or experimentally. Each predicted fragment 256 may be associated with a predicted elemental composition 258 and a corresponding predicted mass 260. The masses 260 may be evaluated at each possible charge state of each fragment 256 to determine a set of predicted m/z values for the fragment 256.

Although FIG. 2B represents a particular type of database for oligos, one of ordinary skill in the art will recognize that the embodiments described herein can be applied to other types of ions and are not limited to the depicted example.

Figure 3:
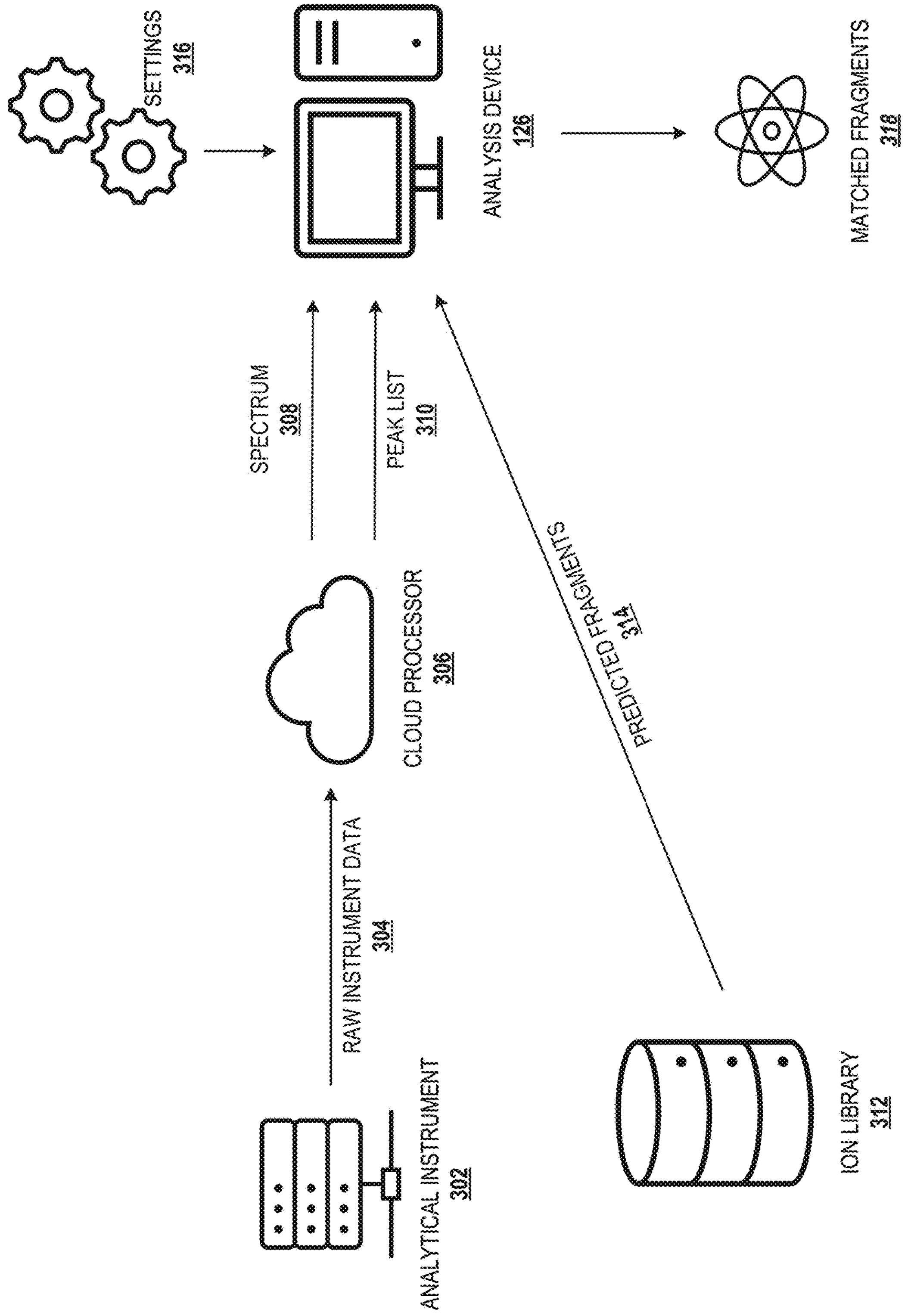
FIG. 3 is a data flow diagram showing a flow of inputs and outputs in an exemplary system.

FIG. 3 is a data flow diagram showing a flow of inputs and outputs in an exemplary system.

In this example, an analytical instrument 302 (such as a mass spectrometer) analyzes a sample to produce raw instrument data 304, such as a readout of the location of impacts of ions on the instrument's detector. This raw instrument data 304 may be provided to a cloud processor 306, such as a server or other type of computing device, which processes the raw instrument data 304 to produce a spectrum 308 and a peak list 310 as discussed above. These may be provided as input to an analysis device 126, which may be a computer or workstation programmed with logic configured to perform the isotope clustering described herein.

The analysis device 126 may also accept, as input, a list of predicted fragments 314 from an ion library 312. The ion library 312 may be accessible to a user via a user interface (which may be displayed via the analysis device 126) and may allow the user to select one or more analytes of interest believed to be present in the sample. The analytes of interest may be selected based on a priori knowledge or expectations about the sample.

Figure 6A:
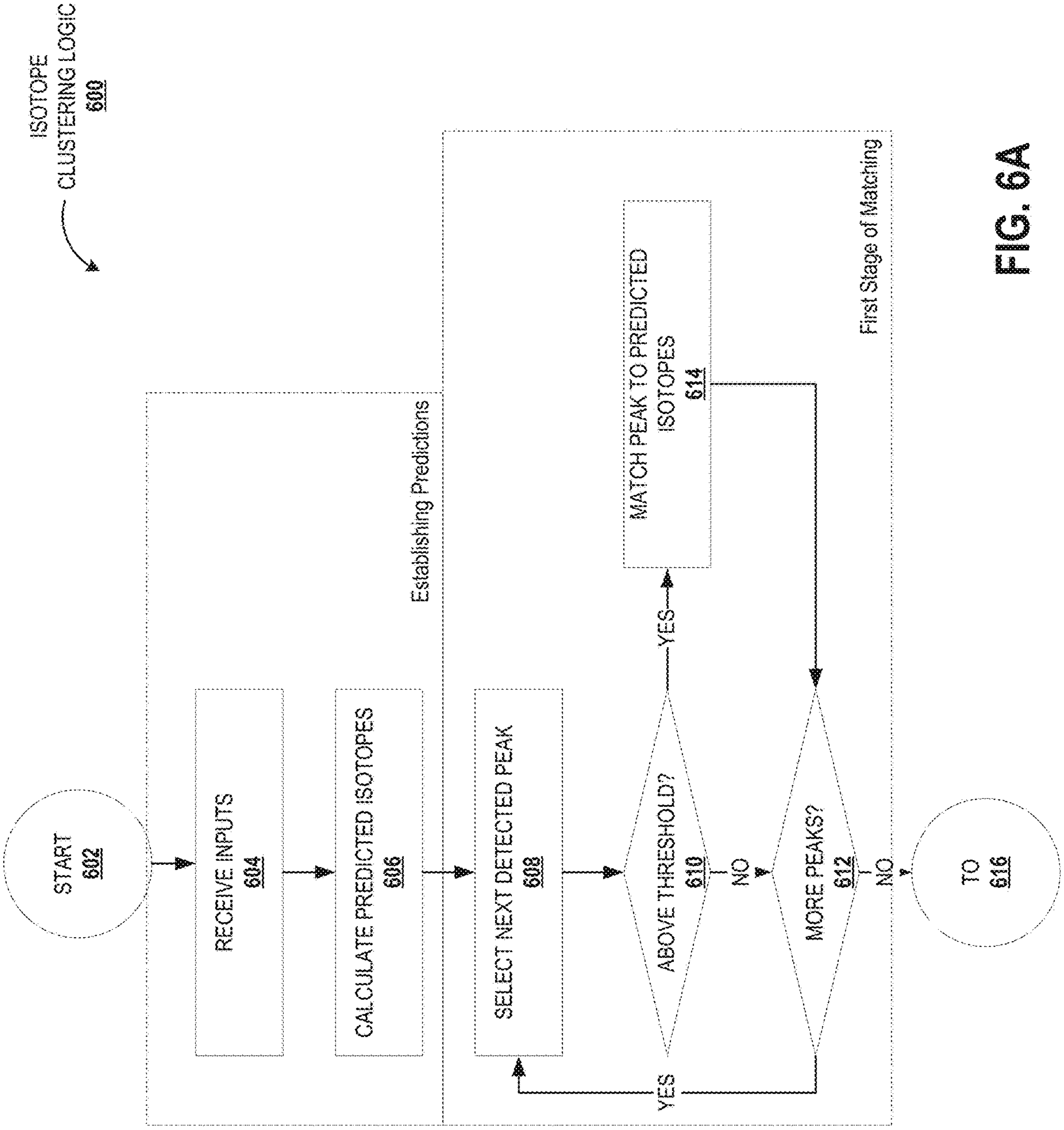
FIGS. 6A-6B is a flowchart depicting logic 600 for performing isotope clustering according to an exemplary embodiment.
Figure 6B:
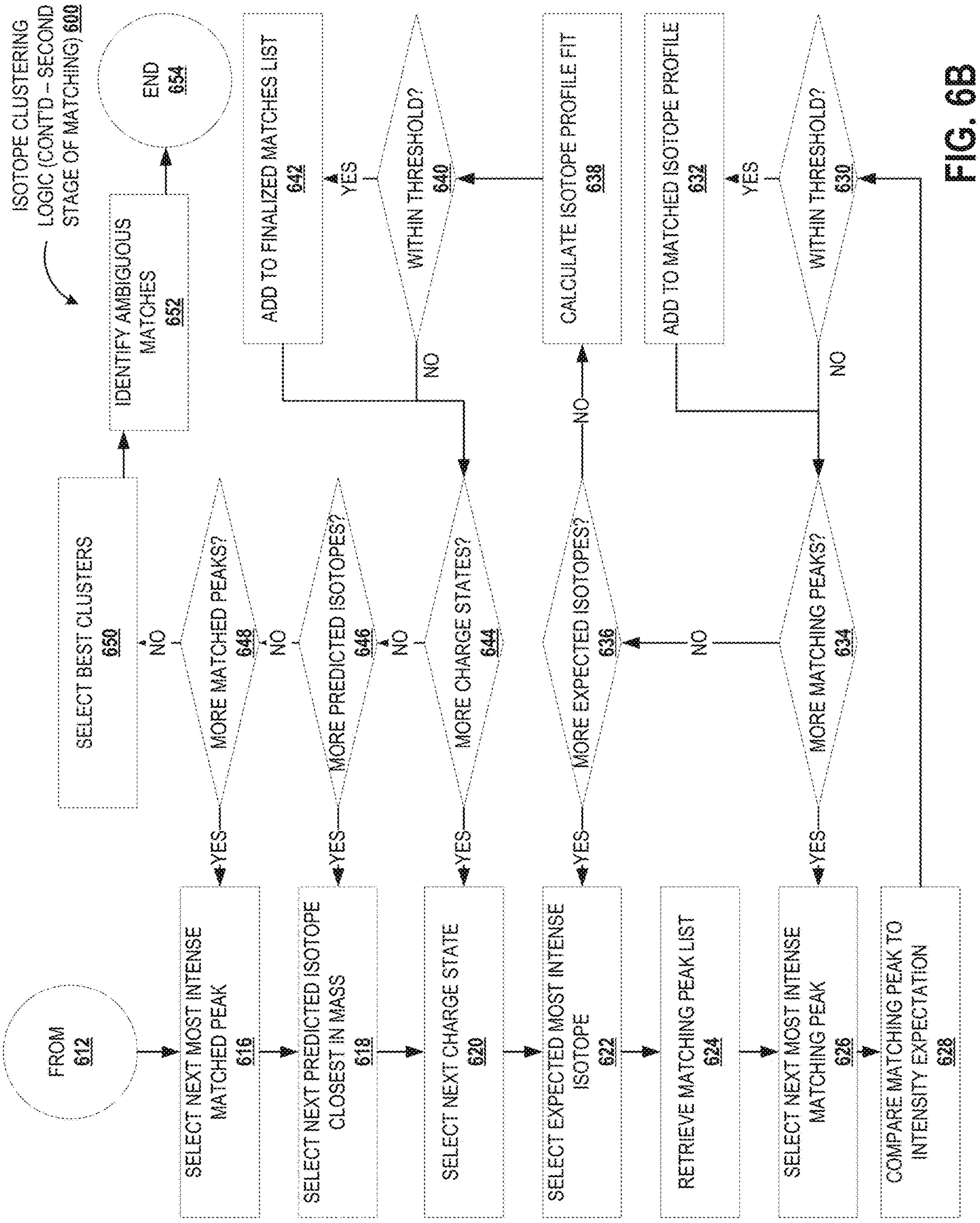

The analysis device may process the spectrum 308 and peak list 310 in an attempt to match the peaks in the spectrum 308 to peaks predicted to arise from the predicted fragments 314 according to isotope clustering logic (see FIGS. 6A-6B). The logic may be configured based on one or more settings 316, which may be default settings or user-specified settings. Examples of settings that may be used to influence the operation of the logic include: the minimum peak intensity, representing an intensity threshold below which peaks in the spectrum will not be considered for matching; a precursor charge, representing the maximum charge state for which the logic will search for fragment matches (a reasonable default value is 10); and a mass tolerance, representing the maximum ppm mass error that is allowed for any detected peak to be considered a possible match to a theoretical/predicted peak.

Based on the spectrum 308, the peak list 310, the predicted fragments 314, and the settings 316, the analysis device may generate a list of matched fragments 318 found in the spectrum 308. The process by which the fragments are matched is described in more detail in connection with FIGS. 6A-6B.

Figure 4:
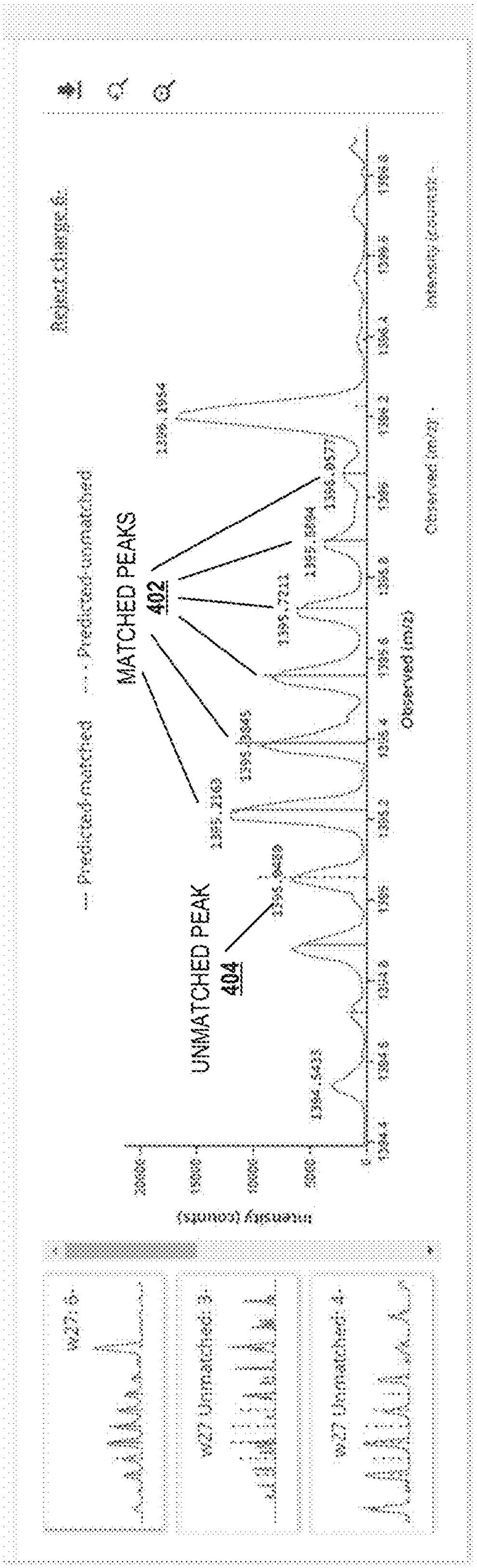
FIG. 4 depicts an example of a spectrum that has been matched to a predicted ion pattern.

FIG. 4 depicts an example of a spectrum that has been matched to a predicted ion pattern, as might be displayed as a result of the isotope clustering logic in an interface to a user. In this case, the predicted ion pattern is shown by vertical lines at particular m/z values. The solid lines represent matched peaks 402, for which peaks in the spectrum were observed at the m/z values (within the tolerance as represented by the mass error tolerance) at the expected intensities (within the tolerance as represented by the intensity tolerance). The dashed lines represent unmatched peaks 404, which either did not match within the mass error tolerance or the intensity tolerance. This particular result represents (as shown on the left side of the interface) a successful attempt to match the observed spectrum to the w27 ion in the 6− charge state. Note that the match can be overridden by selecting the "reject charge 6−" option in the upper right of the interface.

Figure 5:
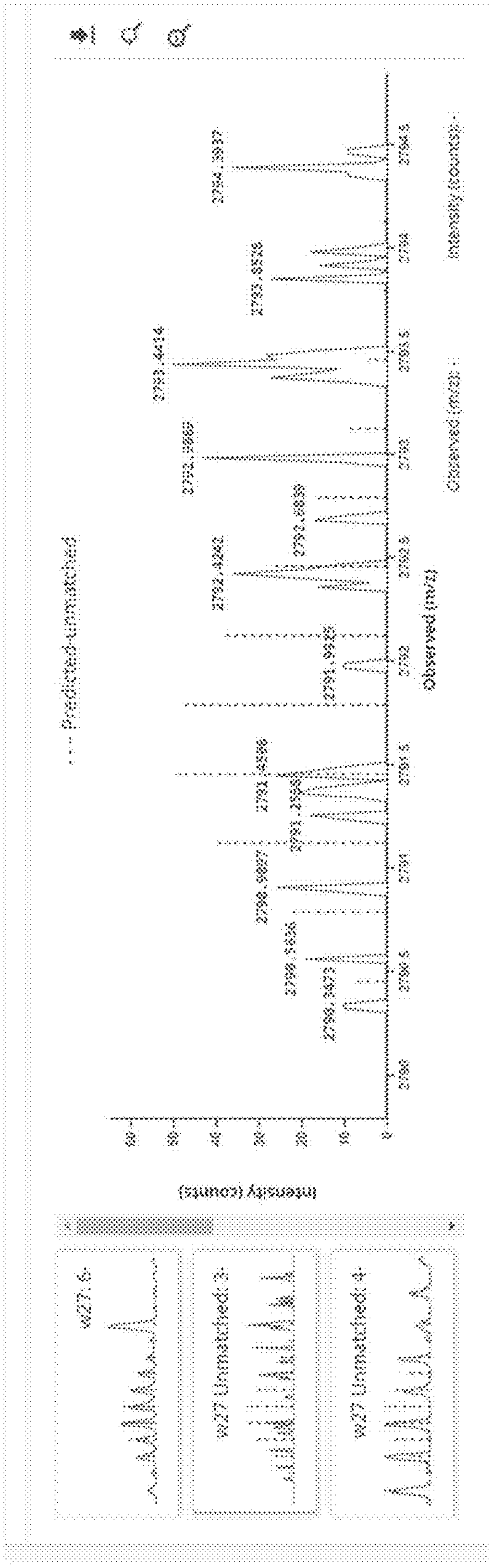
FIG. 5 depicts an example of a spectrum that has not been matched to a predicted ion pattern.

In contrast, FIG. 5 depicts an example of a spectrum that has not been matched to a predicted ion pattern. As shown here, none of the predicted peaks were within the specified tolerances. This particular result represents a failed attempt to match the observed spectrum to the w27 ion in the 3− charge state.

FIGS. 6A-6B is a flowchart depicting logic 600 for performing isotope clustering according to an exemplary embodiment. The logic may be embodied as instructions stored on a computer-readable medium configured to be executed by a processor. The logic may be implemented by a suitable computing system configured to perform the actions described below. Note that FIG. 6A depicts the first stage of the logic (wherein the detected peaks are matched based on mass), and FIG. 6B depicts the second stage (where peaks initially matched in the first stage are used to build charge clusters from which isotope profiles are built).

Processing may begin at start block 602, which may be performed in response to a user or program requesting that data from an analytical laboratory instrument be analyzed in order to identify isotope clusters within the data. For instance, the request may come in the form of an instruction to process the data received through an analytical application associated with the analytical laboratory instrument. The data may be recent data that is processed as it is received from the instrument, or may be previously-acquired data stored in a database.

At block 604, the logic may receive inputs. These inputs may include the spectrum and peak list previously described, as well as any settings that are configured to influence operation of the isotope clustering logic (e.g., settings for the thresholds and/or maximum charge state).

The inputs may also include predicted fragments from the ion library, for example by receiving a selection of a sequence and/or precursor ion for analysis, and then looking up the sequence/precursor in the ion library to determine an associated list of fragments that are expected to result from ionization of the sequence/precursor.

At block 606, the system may calculate predicted isotopes from the predicted fragments received at block 604. The sequence/precursor selected at block 604 and the resulting fragments may be associated with a chemical composition, as previously discussed. The system may determine an expected isotope pattern for each predicted fragment and/or the sequence/precursor, based on each component's respective chemical composition. This may provide a predicted pattern of neutral masses, which can then be further processed based on the available charge states for the component to determine a set of predicted m/z values for each possible charge state.

At block 608, the logic may proceed to the first processing stage whereby the detected peaks are matched to predicted fragment isotopes based on mass. The logic may proceed though each peak identified in the peak list received at block 604 and evaluate it.

At block 610, the currently selected peak is checked against a minimum intensity threshold to determine whether it will be evaluated at all. If the peak is not greater than the minimum intensity threshold, it is discarded and processing proceeds to block 612. If the peak is greater than the minimum intensity threshold, then at block 614 the peak is matched to the predicted isotopes.

In block 614, the system may consider each isotope of every predicted fragment at each possible charge state up to the specified maximum. For each such isotope, the observed m/z of the peak is compared to the expected m/z of the predicted isotope. If the observed m/z value is within +/− the mass tolerance of the expected m/z (as determined by the mass tolerance threshold), then the isotope may be recorded in a list of possible matches.

Processing may then proceed to block 612 and the system may determine whether additional peaks in the peak list remain to be evaluated. If so, processing returns to block 608 and the next peak is selected for evaluation. After all peaks have been evaluated, a complete list of every possible match between observed peaks and predicted isotopes that would pass the specified mass error criteria exists in the list of possible matches. Processing may then proceed to block 616.

Block 616 begins the second stage of matching, whereby charge clusters are built from the potential matches in the list of possible matches and the isotope profiles are finalized.

At block 616, the next most intense peak from the peak list may be selected. The peak selected at block 616 may represent a peak that has not yet been considered in stage two of the matching, with the highest intensity value, which was able to be matched to at least one predicted isotope in the first stage.

It is possible that the peak was only matched to a single predicted isotope in the first stage (i.e., only one predicted isotope was close enough to pass the mass filter in the first stage). If so, processing may skip to block 620 and the isotope may be checked to determine if it passes the intensity filters of the second stage. Otherwise, if more than one predicted isotope passed the mass filter in the first stage, then each predicted isotope will be considered in turn. In this case, at block 618 the next isotope closest in mass to the selected peak may be considered.

This provides a starting point for the search and informs the logic which fragment it should attempt to match first (i.e., the fragment having the isotope identified in block 618 or, if only one isotope was matched to the peak, that isotope; if more than one fragment includes the isotope identified in block 618, then one of the possible matches including that isotope may be selected, and the remaining possible matches may be considered in subsequent iterations of the logic). From this, at block 620, each possible charge state for the fragment is considered in turn (up to the charge state maximum specified in the settings).

At block 622, for each fragment/charge state the logic checks which isotope of the fragment is expected to be the most intense. The list of peaks that were matched to that isotope in the first phase may be retrieved from the possible match list, and they may be considered in intensity order (block 626).

By the choice of a predicted fragment isotope and a matched experimental peak, an intensity expectation is established that can be evaluated against other neighboring peaks (as discussed above). For each peak that was potentially matched to each isotope, at block 628 the observed peak may be compared to the predicted match against the intensity expectation. If the peaks matched to within a threshold amount specified in the settings ("YES" at block 630), then processing may proceed to block 632 and the peak may be added to a matched isotope profile. If not ("NO" at block 630), then the peak may be rejected and the system may proceed to evaluate any remaining peaks that were matched to the isotope (block 634).

Once all the peaks matched to the isotope are considered, the logic may proceed to consider the remaining isotopes in the fragment (block 636). When all the isotopes have been considered, the result is an isotope profile that contains a cluster of peaks that were able to be matched to predictions, and may contain gaps where individual peaks were rejected. At block 638, an isotope profile fit may be calculated to determine whether the cluster of accepted peaks matches the predictions to within a predetermined threshold amount (block 640). If so, the cluster is saved in a finalized matches list (block 642) and processing proceeds to block 644 (to determine if more charge states remain to be evaluated), then to block 646 (to determine if more predicted isotopes matched to the peak currently under consideration), then to block 648 (to determine whether any more peaks remain for consideration).

After every possibility has been considered, the finalized matches list represents a database of fragments that meet the mass, individual peak intensity fit, and cluster intensity fit criteria. In theory, it is possible that each fragment could still have more than one plausible set of finalized charge clusters that meet all the criteria. If this is the case, then at block 650 a best fit may be selected by choosing the cluster set for each fragment that accounts for the greatest total intensity. The logic may cause the best fit to be displayed in an interface similar to the one shown in FIG. 4 (and/or may show any rejected matches in an interface similar to the one shown in FIG. 5).

Figure 7A:
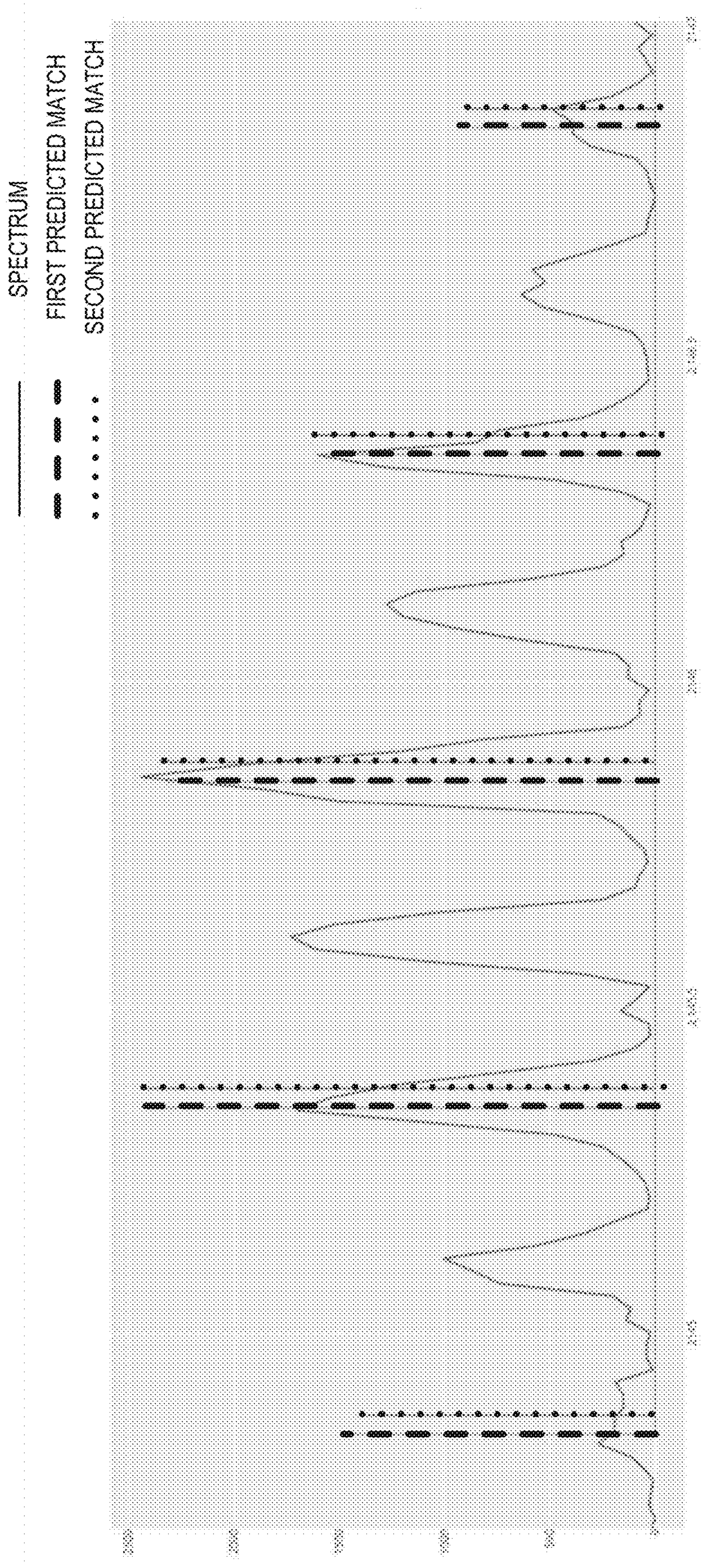
FIG. 7A depicts an example of an ambiguous spectrum in which two fragments share similar neutral masses and compositions.
Figure 7B:
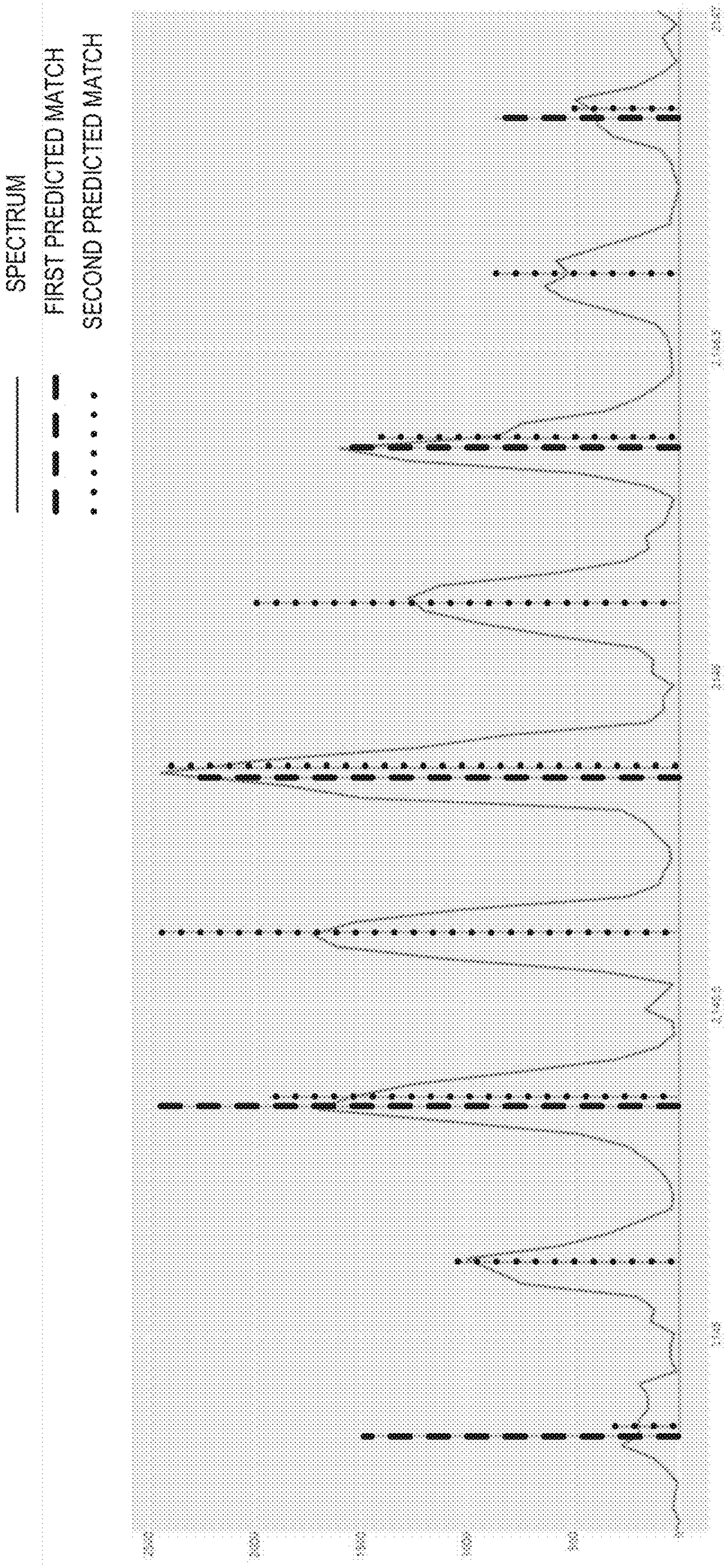
FIG. 7B depicts an example of a spectrum exhibiting ambiguous harmonics.
Figure 7C:
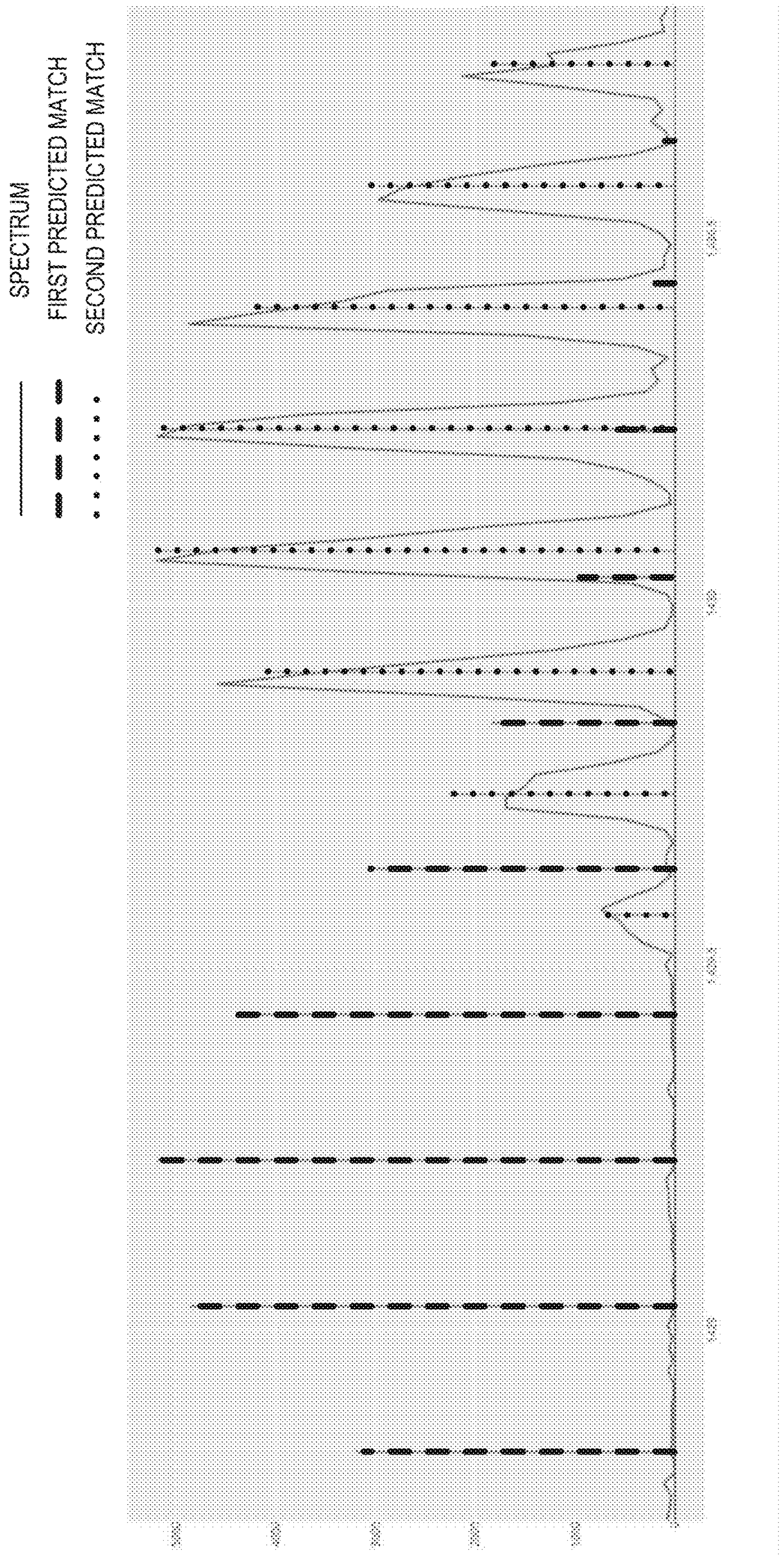
FIG. 7C depicts an example of a spectrum that can potentially be matched to two overlapping ion patterns.

Separately or in parallel, the logic may also identify and present any ambiguous matches (block 652). An ambiguous match may represent a peak that could plausibly be matched to two or more fragments (as illustrated in FIGS. 7A-7C). Sequences can often contain fragments that appear identical or near identical (such as fragments that have similar neutral masses despite different chemical compositions, which means that the fragments will be matched to the same peaks at any charge state). In some cases, it may be possible to resolve an ambiguous match, in which case the match may be flagged as only partially ambiguous with the best fit still selected and presented. In others, it may not be possible to resolve the match, and the match may be presented in an interface as a complete ambiguity.

Processing may then proceed to block 654, where the finalized matches list may be saved in a storage device. Processing may then terminate.

Although FIGS. 6A-6B depict particular actions performed in a specific order, embodiments are not limited to the configuration shown in FIGS. 6A-6B. It is contemplated that more, fewer, or different logical blocks may be implemented. Similarly, it is contemplated that the actions may be performed in a different order than the one shown in FIGS. 6A-6B.

FIGS. 7A-7C depict exemplary interfaces that show ambiguous spectrums. FIG. 7A depicts an example of an ambiguous spectrum in which two fragments share similar neutral masses and compositions. This represents a complete ambiguity that cannot be distinguished by the logic 600. In this case, the two predicted matches may be displayed along with a warning message that the ambiguity cannot be resolved. If the system has access to information about the relative probabilities of encountering each fragment, this information may also be presented; if one fragment is more probable than the other (e.g., above a threshold difference in probability), then the system may select the more probable fragment as the best match while still flagging that the other fragment is a possible match. The user can then interpret the data as appropriate.

FIG. 7B depicts an example of a spectrum exhibiting ambiguous harmonics. In this case, two or more fragments have charge states that coincide in such a way that one of them could match every nth isotope of the other in at least one charge state. These ambiguous matches may also be presented in a display and flagged, although it may be possible to resolve them (thus making them only partially ambiguous). For instance, such fragments can sometimes be separated using the isotope profile, because a low-mass/low-charge ion may have a differently-shaped profile than a high-mass/high-charge ion. The better match will often have a higher cluster profile score that accounts for more intensity in the observed data.

FIG. 7C depicts an example of a spectrum that can potentially be matched to two overlapping ion patterns. In this case, the ions are not close enough in m/z to completely overlap or form harmonics, but there is some overlap between the lightest isotopes of one and the heaviest isotopes of another. In many cases, these ions will not occupy the same space on the m/z axis, which makes it possible to tell them apart by mass or isotope fit. These types of matches may also be flagged as partially ambiguous.

FIG. 8 illustrates one example of a system architecture and data processing device that may be used to implement one or more illustrative aspects described herein in a standalone and/or networked environment. Various network nodes, such as the data server 810, web server 806, computer 804, and laptop 802 may be interconnected via a wide area network 808 (WAN), such as the internet. Other networks may also or alternatively be used, including private intranets, corporate networks, LANs, metropolitan area networks (MANs) wireless networks, personal networks (PANs), and the like. Network 808 is for illustration purposes and may be replaced with fewer or additional computer networks. A local area network (LAN) may have one or more of any known LAN topology and may use one or more of a variety of different protocols, such as ethernet. Devices data server 810, web server 806, computer 804, laptop 802 and other devices (not shown) may be connected to one or more of the networks via twisted pair wires, coaxial cable, fiber optics, radio waves or other communication media.

Computer software, hardware, and networks may be utilized in a variety of different system environments, including standalone, networked, remote-access (aka, remote desktop), virtualized, and/or cloud-based environments, among others.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 810, web server 806, and client computer 804, laptop 802. Data server 810 provides overall access, control and administration of databases and control software for performing one or more illustrative aspects described herein. Data server 810 may be connected to web server 806 through which users interact with and obtain data as requested. Alternatively, data server 810 may act as a web server itself and be directly connected to the internet. Data server 810 may be connected to web server 806 through the network 808 (e.g., the internet), via direct or indirect connection, or via some other network. Users may interact with the data server 810 using remote computer 804, laptop 802, e.g., using a web browser to connect to the data server 810 via one or more externally exposed web sites hosted by web server 806. Client computer 804, laptop 802 may be used in concert with data server 810 to access data stored therein, or may be used for other purposes. For example, from client computer 804, a user may access web server 806 using an internet browser, as is known in the art, or by executing a software application that communicates with web server 806 and/or data server 810 over a computer network (such as the internet).

Servers and applications may be combined on the same physical machines, and retain separate virtual or logical addresses, or may reside on separate physical machines. FIG. 8 illustrates just one example of a network architecture that may be used, and those of skill in the art will appreciate that the specific network architecture and data processing devices used may vary, and are secondary to the functionality that they provide, as further described herein. For example, services provided by web server 806 and data server 810 may be combined on a single server.

Each component data server 810, web server 806, computer 804, laptop 802 may be any type of known computer, server, or data processing device. Data server 810, e.g., may include a processor 812 controlling overall operation of the data server 810. Data server 810 may further include RAM 816, ROM 818, network interface 814, input/output interfaces 820 (e.g., keyboard, mouse, display, printer, etc.), and memory 822. Input/output interfaces 820 may include a variety of interface units and drives for reading, writing, displaying, and/or printing data or files. Memory 822 may further store operating system software 824 for controlling overall operation of the data server 810, control logic 826 for instructing data server 810 to perform aspects described herein, and other application software 828 providing secondary, support, and/or other functionality which may or may not be used in conjunction with aspects described herein. The control logic may also be referred to herein as the data server software control logic 826. Functionality of the data server software may refer to operations or decisions made automatically based on rules coded into the control logic, made manually by a user providing input into the system, and/or a combination of automatic processing based on user input (e.g., queries, data updates, etc.).

Memory 822 may also store data used in performance of one or more aspects described herein, including a first database 832 and a second database 830. In some embodiments, the first database may include the second database (e.g., as a separate table, report, etc.). That is, the information can be stored in a single database, or separated into different logical, virtual, or physical databases, depending on system design. Web server 806, computer 804, laptop 802 may have similar or different architecture as described with respect to data server 810. Those of skill in the art will appreciate that the functionality of data server 810 (or web server 806, computer 804, laptop 802) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method comprising:

receiving a spectrum generated by analysis of a sample with a laboratory analytical instrument, the spectrum comprising a plurality of detected peaks;

receiving a list of predicted fragments that are potentially present in the sample;

matching the plurality of detected peaks against the list of predicted fragments based on a mass tolerance to generate a list of potential matches;

building one or more charge clusters from the list of potential matches based on how well an intensity of each potential match in the list corresponds to an expected intensity of the corresponding predicted fragment;

calculating an isotope profile fit for each of the one or more charge clusters; and for each of the one or more charge clusters whose isotope profile fit exceeds a predetermined profile fit threshold, storing the charge cluster in a finalized match set.

2. The method of claim 1, further comprising:

identifying an ambiguous set of detected peaks capable of being matched to two or more predicted fragments; and flagging the ambiguous set of detected peaks with an indication of the two or more predicted fragments.

3. The method of claim 1, further comprising selecting a best fit from the finalized match set based on which charge cluster accounts for the most total intensity of the corresponding detected peak.

4. The method of claim 1, further comprising:

calculating a quality metric for at least one of the charge clusters stored in the finalized match set, the quality metric comprising one or more of an isotope spacing mean, an isotope spacing median, an isotope spacing deviation, a mass error mean, a mass error median, or a mass error deviation; and displaying the calculated quality metric on a display.

5. The method of claim 1, wherein the expected intensity is associated with a threshold value, the threshold value being in the range of 60%-85%.

6. The method of claim 1, wherein a first charge cluster and a second charge cluster are matched to a same detected peak, and after the first charge cluster is matched to the detected peak, an intensity of the detected peak is discounted when matching the second charge cluster.

7. The method of claim 1, further comprising defining a maximum charge for a precursor ion in the analysis, wherein the list of predicted fragments is limited based on the maximum charge for the precursor ion.

8. The method of claim 1, wherein the list of predicted fragments is retrieved from an ion library based on a priori knowledge about molecules expected to be present in the sample.

9. The method of claim 1, wherein matching the plurality of detected peaks against the list of predicted fragments based on the mass tolerance comprises a first stage of processing that generates a list of possible matches between observed peaks and predicted isotopes that pass the mass tolerance, and wherein building the one or more charge clusters from the list of potential matches comprises a second stage of processing in which the detected peaks are considered in order of decreasing intensity.

10. A non-transitory computer-readable storage medium, the computer-readable storage medium including instructions that when executed by a computer, cause the computer to:

receive a spectrum generated by analysis of a sample with a laboratory analytical instrument, the spectrum comprising a plurality of detected peaks;

receive a list of predicted fragments that are potentially present in the sample;

match the plurality of detected peaks against the list of predicted fragments based on a mass tolerance to generate a list of potential matches;

build one or more charge clusters from the list of potential matches based on how well an intensity of each potential match in the list corresponds to an expected intensity of the corresponding predicted fragment;

calculate an isotope profile fit for each of the one or more charge clusters; and for each of the one or more charge clusters whose isotope profile fit exceeds a predetermined profile fit threshold, store the charge cluster in a finalized match set.

11. The medium of claim 10, further storing instructions for:

identifying an ambiguous set of detected peaks capable of being matched to two or more predicted fragments; and flagging the ambiguous set of detected peaks with an indication of the two or more predicted fragments.

12. The medium of claim 10, further storing instructions for selecting a best fit from the finalized match set based on which charge cluster accounts for the most total intensity of the corresponding detected peak.

13. The medium of claim 10, further storing instructions for:

calculating a quality metric for at least one of the charge clusters stored in the finalized match set, the quality metric comprising one or more of an isotope spacing mean, an isotope spacing median, an isotope spacing deviation, a mass error mean, a mass error median, or a mass error deviation; and displaying the calculated quality metric on a display.

14. The medium of claim 10, wherein the expected intensity is associated with a threshold value, the threshold value being in the range of 60%-85%.

15. The medium of claim 10, wherein a first charge cluster and a second charge cluster are matched to a same detected peak, and after the first charge cluster is matched to the detected peak, an intensity of the detected peak is discounted when matching the second charge cluster.

16. The medium of claim 10, further storing instructions for defining a maximum charge for a precursor ion in the analysis, wherein the list of predicted fragments is limited based on the maximum charge for the precursor ion.

17. A computing apparatus comprising:

a processor; and a memory storing instructions that, when executed by the processor, configure the apparatus to:

receive a spectrum generated by analysis of a sample with a laboratory analytical instrument, the spectrum comprising a plurality of detected peaks;

receive a list of predicted fragments that are potentially present in the sample;

match the plurality of detected peaks against the list of predicted fragments based on a mass tolerance to generate a list of potential matches;

build one or more charge clusters from the list of potential matches based on how well an intensity of each potential match in the list corresponds to an expected intensity of the corresponding predicted fragment;

calculate an isotope profile fit for each of the one or more charge clusters; and for each of the one or more charge clusters whose isotope profile fit exceeds a predetermined profile fit threshold, store the charge cluster in a finalized match set.

18. The apparatus of claim 17, the memory further storing instructions for:

identifying an ambiguous set of detected peaks capable of being matched to two or more predicted fragments; and flagging the ambiguous set of detected peaks with an indication of the two or more predicted fragments.

19. The apparatus of claim 17, the memory further storing instructions for selecting a best fit from the finalized match set based on which charge cluster accounts for the most total intensity of the corresponding detected peak.

20. The apparatus of claim 17, the memory further storing instructions for:

calculating a quality metric for at least one of the charge clusters stored in the finalized match set, the quality metric comprising one or more of an isotope spacing mean, an isotope spacing median, an isotope spacing deviation, a mass error mean, a mass error median, or a mass error deviation; and displaying the calculated quality metric on a display.

21. The apparatus of claim 17, wherein the expected intensity is associated with a threshold value, the threshold value being in the range of 60%-85%.

22. The apparatus of claim 17, wherein a first charge cluster and a second charge cluster are matched to a same detected peak, and after the first charge cluster is matched to the detected peak, an intensity of the detected peak is discounted when matching the second charge cluster.

* * * * *